United States Patent [19]

Holdridge

[11] 4,312,330

[45] Jan. 26, 1982

[54] FOCUSING DEVICE FOR CONCENTRATING RADIATION

[75] Inventor: David W. Holdridge, Fullerton, Calif.

[73] Assignee: Swedlow, Inc., Garden Grove, Calif.

[21] Appl. No.: 178,915

[22] Filed: Aug. 18, 1980

Related U.S. Application Data

[63] Continuation-in-part of Ser. No. 163,343, Jun. 26, 1980, abandoned, which is a continuation of Ser. No. 936,106, Aug. 23, 1978, abandoned.

[51] Int. Cl.$^3$ ............................................. F24J 3/02
[52] U.S. Cl. .................................. 126/440; 126/417; 136/246; 350/452
[58] Field of Search ............... 126/440, 417, 432, 438, 126/439; 350/211; 136/246, 244; 250/229

[56] References Cited

U.S. PATENT DOCUMENTS

| | | | |
|---|---|---|---|
| 937,013 | 10/1909 | Senery | 126/440 X |
| 1,101,001 | 6/1914 | Willsie | 126/440 |
| 1,130,871 | 3/1915 | Willsie | 126/440 |
| 2,687,126 | 8/1954 | Bouchet | 126/440 |
| 3,162,766 | 12/1964 | Ploke | 136/246 X |
| 3,902,794 | 9/1975 | Abrams | 126/440 X |
| 4,069,812 | 1/1978 | O'Neill | 126/440 |

FOREIGN PATENT DOCUMENTS

2631412 4/1977 Fed. Rep. of Germany ...... 126/440

Primary Examiner—Larry Jones
Attorney, Agent, or Firm—Fulwider, Patton, Rieber, Lee & Utecht

[57] ABSTRACT

A focusing device for concentrating radiation, such as sunlight, and producing a prescribed distribution of energy over a target surface. The principles of the device have both photovoltaic and photothermal applications, and can be embodied in either a lens or a mirror, having a plurality of discrete focusing surfaces for redirecting radiation onto a target surface. The angle for each of the respective focusing surfaces, relative to the direction of the radiation being received, is selected to redirect an increment of such radiation to a unique portion of the target surface, whereby a superposition of the radiation increments redirected by all of the focusing surfaces produces the prescribed distribution of energy on the target. In one embodiment, a plurality of focusing segments is provided each having a plurality of the focusing surfaces for irradiating the target surface with a prescribed energy distribution. Apparatus is provided for selectively masking predetermined ones of the focusing segments for controllably adjusting the magnitude of light energy concentrated upon the target surface in a plurality of known and discrete steps.

15 Claims, 10 Drawing Figures

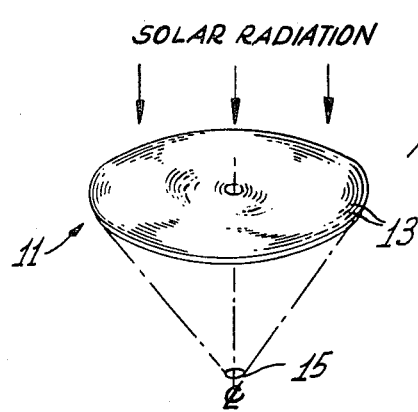
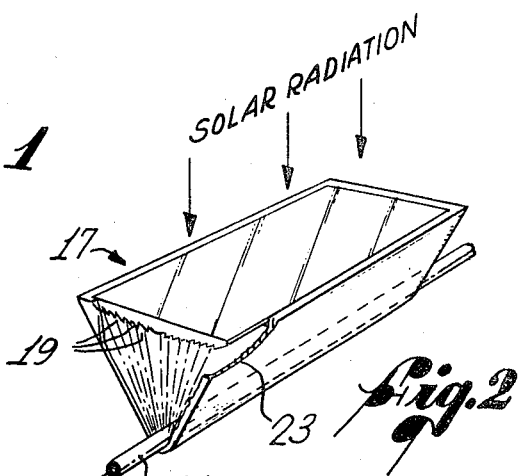
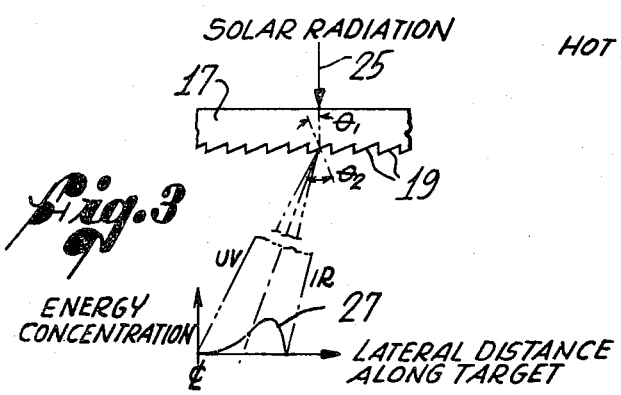
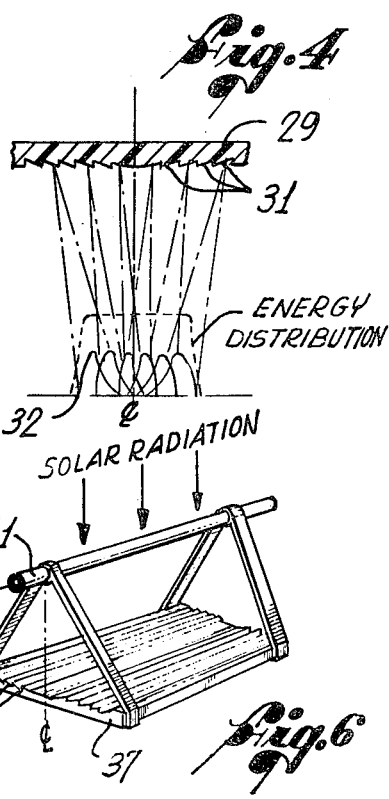
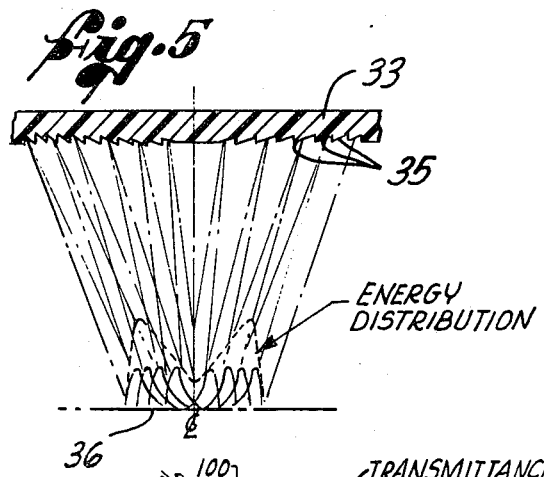
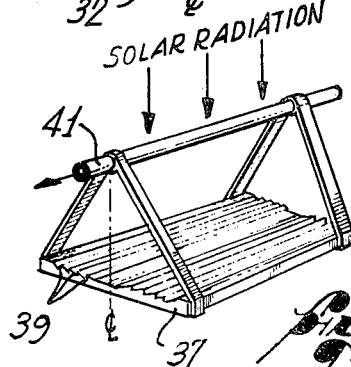
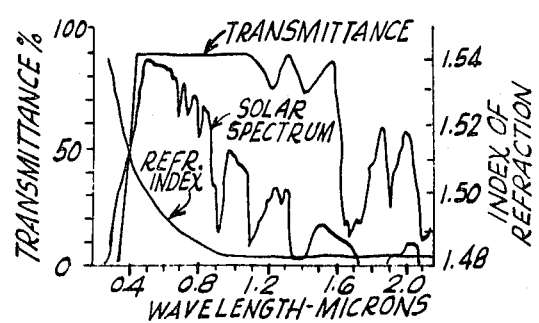

FOCUSING DEVICE FOR CONCENTRATING RADIATION

BACKGROUND OF THE INVENTION

This is a continuation-in-part of copending application Ser. No. 163,343, filed June 26, 1980, which in turn is a continuation of Ser. No. 936,106, filed Aug. 23, 1978, both now abandoned.

This invention relates generally to focusing devices and, more particularly, to improvements in devices for concentrating radiation on a target surface.

Transducers for converting radiation, especially solar radiation, into other, more useable, forms of energy have long been known, but have met with increasing use in recent years. Many such transducers have included refractive or reflective lenses for concentrating solar radiation on a target surface. In photovoltaic applications, the target surface can be a photocell, and in photothermal applications, the target surface can be a pipe for heating a fluid. In the former case, curcular lenses are generally used, and, in the latter case, cylindrical lenses are generally used. Fresnel-type lenses have proven particularly beneficial, because they permit a substantial reduction in the size and weight of the lens, and minimize absorption of radiation by the lens material.

In the past, fresnel-type lenses for concentrating solar radiation have customarily been of conventional design, having a prescribed focal length and functioning to focus solar radiation substantially on a small area in the focal plane. The lenses have not proven entirely satisfactory for radiant energy conversion, however, because they have not achieved an optimum distribution of energy throughout the target surface, which is necessary for efficient energy conversion.

Additionally, chromatic dispersion, especially for lenses having relatively short focal lengths, causes a substantial amount of the redirected solar radiation to miss the target surface. The concentration ratios produced by these prior lenses typically have been very high at the target center, diminishing to very low levels at the target periphery. This type of distribution is undesirable for transducer systems, since the target surface (e.g. a photocell) may not then be operating at a uniformly high efficiency, and since significant thermal gradients within the target surface might be produced, thereby causing undesirable physical strains and local over-heating.

In many instances, it is desirable to illuminate a target surface with a special energy distribution. For example, many photocells operate most efficiently if their entire surfaces are substantially evenly illuminated. In other applications, on the other hand, it is desirable to produce a higher energy concentration for some particular portions of a photocell than for others, thereby taking advantage of certain inherent efficiency characteristics of the particular cell being used. This is the case, for example, with photocells having an annular current collection bus at the periphery of the cell. For such cells, it is desirable to produce a higher energy concentration at the periphery of the cell than at the center, where electrical current that are produced encounter additional resistive losses in being conducted to the bus. Conventional fresnel lens designs do not provide such a tailored energy distribution.

In some applications, it is further desirable to vary the special energy distribution on the target surface in a plurality of discrete steps to vary in a controlled manner the magnitude of the radiation energy applied to the target surface. For example, in a laboratory environment, it is frequently required to illuminate solar cells and the like with a prescribed magnitude of radiation energy, and to vary the concentration over a prescribed number of discrete steps in order to ascertain the operating characteristics of the particular solar cell. In the prior art, a family of conventional and interchangeable fresnel lenses have been used to focus light energy on the target surface, with each lens having a prescribed light concentration ratio. However, as described above, conventional fresnel lenses do not provide the desired customized energy distribution on the target surface, and the requirement of several fresnel lenses substantially increases the cost and complexity of the laboratory test system.

It will be appreciated from the foregoing that there is a definite need for a device for concentrating solar radiation that can provide a prescribed energy distribution over a target surface, while still concentrating a maximum amount of solar radiation on the target surface. Further, there is a definite need for a single and relatively inexpensive device for irradiating a target surface with a prescribed energy distribution which is adjustable in a plurality of discrete steps.

SUMMARY OF THE INVENTION

This invention resides in an improved focusing device of the type having a plurality of discrete radiation focusing surfaces or facets, for focusing radiation onto a target surface. In accordance with the invention, the angles of the respective focusing surfaces relative to the received radiation are selected to focus radiation not to a common small area of the focal plane, as is the case with conventional focusing devices, but rather, to predetermined non-common portions of the target surface, whereby a superposition of the radiation redirectd by all of the focusing surfaces produces a prescribed distribution of energy over the target surface. The non-common portions of the target surface can be unique for each focusing surface, or, alternately, some of the portions can correspond to more than one (but not all) of the focusing surfaces.

More particularly, a focusing device constructed in accordance with the present invention can take the form of a fresnel-type lens or mirror, which is positioned adjacent the target surface and adapted to receive solar radiation. The device can have, for example, annular facets that direct the radiation to a target such as a circular photocell, or, alternatively, linear facets that direct the radiation to a linear receiver, such as a heat pipe.

Preferably, the focusing device, which can be in the form of a flat sheet, is used in combination with means for maintaining it in a fixed relationship to the target surface, along with means for maintaining the plane of the device substantially perpendicular to the solar radiation being received. This insures that the radiation is always directed onto the target surface, regardless of the position of the sun in the sky. Alternatively, the focusing device can be in a fixed position and can be used in combination with means for moving the target surface to follow the focused radiation as the sun moves through the sky.

For a focusing device in the form of a fresnel lens, solar radiation received by each focusing surface is refracted and dispersed according to its wavelength. Further, the particular energy distribution produced on the target by each focusing surface is a function of the spectrum of the solar radiation being received and the transmittance and refractive index of the lens material, both of which vary according to the wavelength being considered. The degree of refraction and chromatic dispersion increases with the angle of the focusing surface relative to the radiation being received. For reflective focusing devices, on the other hand, chromatic dispersion is not a factor in the determination of the resultant distribution of energy.

For photovoltaic applications, any wavelength sensitivities of the receiver can be taken into account by appropriately weighing the concentrated energy according to its wavelength. This yields an effective distribution of energy that is a better indication of the resultant electrical current generated by the receiver.

A superposition of the energy distribution produced by each of the focusing surfaces yields a composite distribution of energy over the target surface. By appropriately selecting the particular angle relative to the received radiation for each focusing surface, a tailored composite energy distribution over the target surface can be produced.

In most situations, it is preferable for all of the focusing surfaces to be equal in width and for the surfaces to have progressively increasing angles relative to the received radiation, as the distance from the centerline of the focusing device increases. Additionally, cast acrylic devices, with each focusing surface having a constant angle over its entire width, have been found to provide excellent results.

The energy distribution produced by each focusing surface may overlap the respective distributions for adjacent surfaces, but each such distribution is located on a unique portion of the target surface. Thus, each portion of the target surface is illuminated by radiation received from a corresponding, unique portion of the focusing device.

For many applications, an energy distribution that is substantially uniform over the entire target surface is preferred. One focusing device for providing such an energy distribution can have focusing surfaces with successively increasing angles as the distance from the centerline of the device increases, with the difference between the successive angles being slightly greater at the centerline of the device than at its periphery.

The particular angles for the respective focusing surfaces can be selected by a number of suitable techniques, one being an iterative technique in which a set of angles is initially selected and repeatedly modified until the resultant energy distribution is sufficiently close to the desired distribution. In making the repeated angle modifications, an increase is made in the angular differences for focusing surfaces in portions of the device that produce an energy concentration determined to be too high, and a decrease is made in the angular differences for portions that produce an energy concentration determined to be too low.

In one embodiment of the invention, a focusing device is provided including a plurality of focusing segments each including a purality of the focusing surfaces described above. The focusing surfaces of each discrete focusing segment are designed to focus light energy upon the particular target surface with a prescribed energy distribution, such as a uniform energy distribution over the area of the target surface. The various focusing segments cooperate with masking means such as an adjustable iris diaphragm for selectively masking a prescribed number of the focusing segments, and thereby allow discrete control of the magnitude of the light energy falling upon the target surface.

Other aspects and advantages of the present invention will become apparent from the following description of the preferred embodiments, taken in conjunction with the accompanying drawings, which disclose, by way of example, the principles of the invention.

BRIEF DESCRIPTION OF THE DRAWINGS

In the accompanying drawings:

FIG. 1 is a simplified perspective view of a fresnel-type lens embodying the present invention, the lens having circular facets for concentrating solar radiation on a circular target surface;

FIG. 2 is a simplified perspective view of another fresnel-type lens embodying the present invention, the lens having linear facets for concentrating solar radiation on a heat pipe;

FIG. 3 is a partial sectional view of the lens of FIG. 2, showing the refraction of a solar radiation beam onto the target surface;

FIG. 4 is a simplified sectional view of a fresnel-type lens that provides a uniform distribution of energy on a target surface;

FIG. 5 is a simplified sectional view of a fresneltype lens that provides a tailored distribution of solar energy on a target surface, wherein the energy concentration is lowest at the center of the target and highest at the periphery of the target;

FIG. 6 is a simplified perspective view of a reflective mirror device embodying the present invention, the mirror device having a plurality of discrete, linear reflecting surfaces for focusing solar radiation onto a heat pipe;

FIG. 7 is a graphical representation of the solar radiation spectrum, along with the transmittance and index of refraction of a cast acrylic lens material;

DESCRIPTION OF THE PREFERRED EMBODIMENTS

Figure 8:
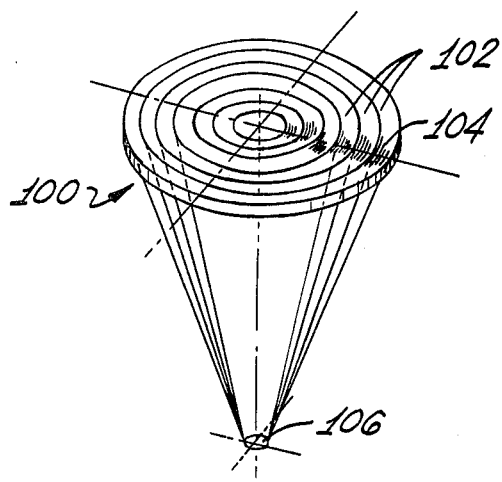
FIG. 8 is a simplified perspective view of a complex fresnel-type lens embodying an alternate arrangement of the invention, the lens having a plurality of focusing segments each with circular facets for concentrating solar radiation upon a circular target surface.

Referring now to the drawings, there are shown a number of focusing devices constructed in accordance with the present invention. FIG. 1 shows a first embodiment, which comprises a fresnel-type lens 11 having a plurality of concentrically arranged, annular refracting surfaces or facets 13 for focusing solar radiation on a circular target surface 15, and FIG. 2 shows an alternative embodiment, which comprises a fresnel-type lens 17 having a plurality of linear refracting surfaces of facets 19 for focusing solar radiation on a receiver in the form of a heat pipe 21.

In accordance with the invention, the angles of the respective facets relative to the received solar radiation are selected not to focus the radiation onto a common small area in a focal plane, but rather, to focus the radiation onto predetermined non-common portions of the target surface, whereby a superposition of the energy refracted by all of the facets produces a prescribed distribution of solar energy over the target surface. Thus, whether the lens is to be used in a photovoltaic or a photothermal application, it can be adapted to produce a distribution of energy on a receiver that will enable the receiver to operate most efficiently.

As shown in FIG. 2, the lens is used in combination with a support structure 23 for maintaining the lens in a fixed relationship relative to the receiver 21. Additionally, the support structure forms an enclosure to protect the receiver and the refracting facets 19 from dust, dirt, and moisture. The lens can also be used with means (not shown) for maintaining the lens in a fixed orientation relative to the solar radiation being received, whereby the radiation is focused onto the receiver regardless of the position of the sun in the sky. Alternatively, the lens can be maintained in a fixed position and used in combination with means for moving the receiver to follow the focused radiation as the sun moves through the sky.

FIG. 3 is a sectional view of a small portion of the lens of FIG. 2. It shows an incident beam of solar radiation 25 being refracted by one of the lens facets 19, to produce a distribution of energy 27 on the target surface 21. The chromatic dispersion of the radiation beam can be readily noted, with the ultraviolet radiation being refracted by a substantially greater amount than the infrared radiation. It can also be noted that the infrared portion of the refracted beam has a much sharper edge than the ultraviolet portion, this resulting from inherent characteristics of the lens material, which is preferably cast acrylic. As will be discussed in more detail, the precise energy distribution produced by each facet depends on the spectral content of the radiation, the index of refraction of the lens material and the physical characteristics of the lens facet.

FIG. 4 is a simplified sectional view of a fresneltype lens 29 having a plurality of facets 31 with angles selected to produce a uniform distribution of energy over a target surface 32. To simplify the drawing, only a relatively few number of facets are shown, although lenses with several hundred facets having equal widths of about 0.025 inches have been constructed. It will be noted that the angles of the respective facets are progressively larger as the distance from the centerline of the lens increases. The center facet has an angle of 0° and transmits the radiation directly to the center of the target surface, and the peripheral facets have the steepest angles and refract the radiation by a maximum amount toward the periphery of the target surface.

Although the energy distribution produced by each of the facets 31 may overlap the respective energy distributions for adjacent facets, each is preferably directed to a unique portion of the target surface. Thus, it will be appreciated that each portion of the target surface is illuminated by radiation received from a corresponding uique portion of the lens 29. It will also be appreciated that the radiation refraction depicted in FIG. 4 is representative of the operation of a fresnel-type lens having linear facets, such as the lens shown in FIG. 2.

Similar to FIG. 4, FIG. 5 is a simplified sectional view of a fresnel-type lens 33 having a plurality of facets 35 with angles selected to produce a tailored, non-uniform distribution of solar energy on a target surface 36. As shown, the energy concentration is a minimum at the center of the target surface 36 and a maximum at the periphery of the target surface. This is accomplished by selecting the relative angles for the respective facets such that there is a relatively large difference between the angles of adjacent facets near the center of the lens, and a relatively small difference between the angles for adjacent facets near the periphery of the lens. Such an energy distribution is useful, for example, for photocells that have a generally annular current collecting bus encircling the cell, whereby it is desirable to direct a greater proportion of radiation toward the periphery of the photocell, where resulting electrical currents will not encounter additional resistive losses in being transmitted to the bus.

The particular distribution of solar energy directed to the target surface by a single refracting facet is a function of the facet angle, the wavelength spectrum of the solar radiation, and the transmittance and index of refraction of the lens material. FIG. 7 is a graphical depiction of the solar spectrum, and of the wavelength-sensitive transmittance and index of refraction for a cast acrylic lens having a thickness of about one-eighth inch. The transmittance of acrylic is limited primarily because of reflection of the incident beam off the upper and lower surfaces of the lens, and, to a lesser extent, because of absorption.

With reference to FIGS. 3 and 7, it will be readily understood that the distribution of energy refracted by a single facet can be determined analytically by initially determining the spectrum of the radiation emerging from the lens, and by then using Snell's Law, which is stated as follows:

$$N_1 \sin(\theta_1) = N_2 \sin(\theta_2)$$

where:
$N_1$ = index of refraction for the lens material,
$N_2$ = index of refraction for the medium between the lens and the target,
$\theta_2$ = angle of incidence, and
$\theta_2$ = angle of refraction.
The composite distribution of solar energy on the target surface can then be determined by a superposition of the separate energy distributions produced by the separate facets.

It will be noted in FIG. 7, that the cast acrylic lenses, the index of refraction is substantially uniform for wavelengths between about 0.1 and 2.2 microns. As a result, the distribution of energy refracted by each facet will have a sharp edge for the infrared side of the refracted beam. As will soon become apparent, this sharp edge feature can be useful in maximizing the amount of refracted radiation incident on the target surface.

An additional consideration for lenses used in photovoltaic applications is that the wavelength sensitivity of the particular photocell being used can be accounted for by appropriately weighing the refracted radiation with the "quantum efficiency" curve for that cell. This produces an energy distribution that better corresponds to the resultant electrical current generated by the photocell.

Where precision is required in the tailoring of a prescribed energy distribution on the target surface, the finite size of the light source, such as the sun, can be taken into consideration. This can be readily accomplished by dividing, for example, the solar disk into a plurality of contiguous discrete segments, preferably defined by suitable polar coordinates, and by then determining the energy distribution on the target surface resulting from each of the solar segments. These determinations can include consideration of radiation refraction by the upper surface of the lens, in accordance with Snell's Law. Summing the separate distributions then produces the composite energy distribution. Using this technique, variations in both the intensity and the wavelength spectrum of the solar radiation across the surface of the solar disk can be accounted for. Such variations are described in an article entitled "Distribution of Radiation Over the Sun's Disk", appearing in *Solar Energy*, Vol. 13, pp. 243-250, published in Great Britain by Pergamon Press, 1971.

As stated earlier, a prescribed tailored distribution of energy over the target surface is produced by an appropriate selection of the angles for each of the lens facets. One suitable technique for selecting the respective angles is an iterative process, wherein a particular set of angles is initially selected for the lens facets and the resultant distribution of energy on the target surface is compared to the prescribed energy distribution. Based on the results of this comparison, the respective facet angles are modified and a new energy distribution is determined. The process is repeated until the resultant energy distribution is determined to be sufficiently close to the prescribed tailored distribution.

In selecting the angles for the respective lens facets, it is beneficial to select the center facet, which is aligned with the centerline of the target surface, to have an angle of 0° and thus direct solar radiation it receives to the center of the target surface, the outermost facet to have the steepest angle and direct radiation it receives to the periphery of the target surface, and intermediate facets to have progressively greater angles as the distance from the centerline of the lens increases. Knowing the distance between the plane of the lens and the target surface, and knowing the respective sizes of the lens and the target surface, then the maximum facet angle (for the outermost facet) can be readily determined. Further, knowing the number of lens facets, the average difference between the angle of adjacent facets can then be determined.

It is beneficial to initially select the facet angles such that the differences between adjacent angles are generally proportional to the inverse of the desired energy concentration for the corresponding portion of the target surface. Thus, in determining appropriate facet angles for achieving a uniform energy distribution, for example, the initial selection of angles should be such that the differences between the angles on adjacent facets is roughly constant over the entire width of the lens. Additionally, when modifying the facet angles in accordance with a comparison of the previously determined energy distribution and the prescribed distribution, it is beneficial to increase the angle differences for portions of the lens producing an energy concentration determined to be too high, and to decrease the angle differences for portions of the lens producing an energy concentration determined to be too low.

The table shown below lists the relative angles of a representative number of refracting facets for a circular fresnel-type lens that produces a uniform distribution of energy over a circular target surface. The lens has a diameter of 15 inches and there are approximately 40 facets per inch, with each facet having a constant angle over its entire width. Additionally, the lens is positioned 15 inches from the target surface, and the target surface has a diameter of 1.7324 inches.

| Radial Distance From Centerline of Lens (inches) | Facet Angle (degrees) |
| --- | --- |
| 0 | 0 |
| 1 | 6.782 |
| 2 | 13.386 |
| 3 | 19.243 |
| 4 | 24.161 |
| 5 | 28.223 |
| 6 | 31.584 |
| 7 | 34.375 |
| 7.5 | 35.585 |

In some applications, it is desirable only to maximize the amount of radiation incident on the target surface. This may be the case, for example, in some photothermal applications, wherein the receiver can readily conduct energy along its surface to compensate for any variations in the energy distribution. The total incident radiation can be maximized by selecting each refracting surface to have an angle that directs a maximum amount of the radiation it receives onto the receiver. For cast acrylic lenses, which have facets that produce refracted radiation beams having a significantly sharper edge for infrared radiation than for ultraviolet radiation, this can be accomplished by appropriately selecting the angle of each facet such that the peak of the energy distribution it produces is directed to a predetermined location spaced from the centerline of the receiver. In particular, the angle of each facet should be selected such that, for the refracted beam it produces, the concentration of infrared radiation at one edge of the receiver is substantially equal to the concentration of ultraviolet radiation at the other edge of the receiver.

FIG. 6 depicts an alternative embodiment of the present invention, wherein the focusing device is in the form of a rectangularly-shaped mirror 37 having a plurality of discrete linear reflecting surfaces 39 for focusing solar radiation onto a heat pipe 41. The particular angles selected for the respective reflective surfaces are selected to produce a prescribed distribution of solar radiation on the pipe. The angle selection for the reflecting surfaces is this embodiment can be accomplished substantially more easily than for embodiments utilizing refracting surfaces, since chromatic dispersion does not occur. Otherwise, the same iterative technique used in selecting the facet angles for the fresnel-type lens embodiments, described above, can be used to select the respective facet angles in this embodiment.

From the foregoing description, it should be apparent that the present invention provides an improved focusing device for concentrating solar radiation and producing a prescribed distribution of energy on a target surface. The invention permits a more efficient utilization of solar radiation by allowing a tailoring of the distribution of the focused radiation, to take advantage of inherent characteristics of the receiver or to direct a maximum amount of solar energy onto the target.

Figure 9:
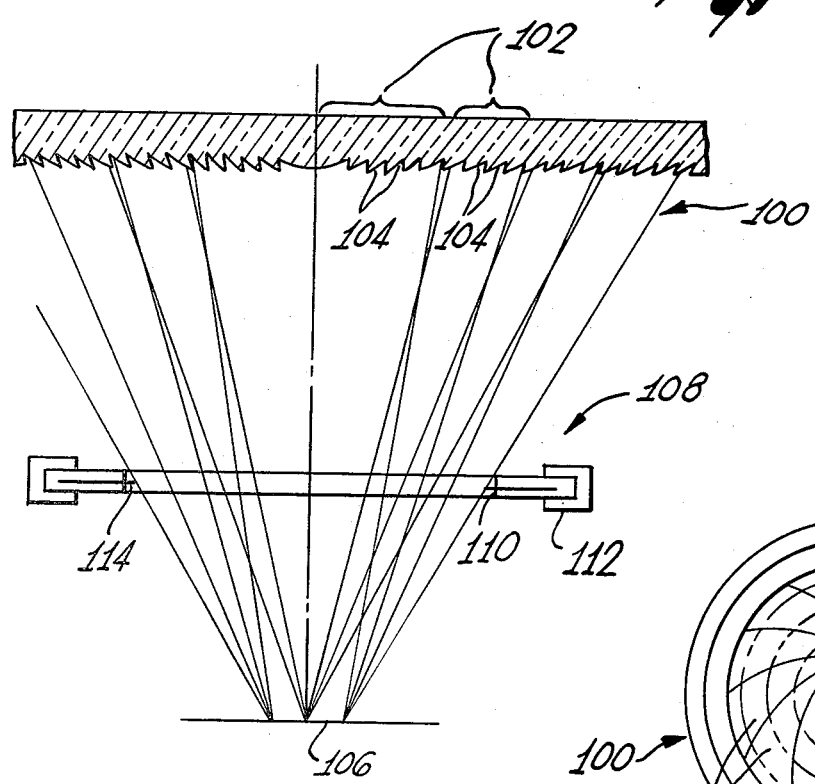
FIG. 9 is a simplified sectional view of the lens of FIG. 8 in combination with apparatus for controllably masking the lens focusing segments.
Figure 10:
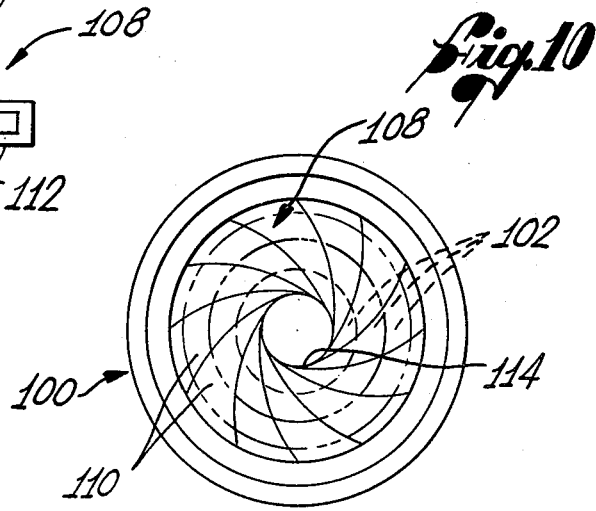
FIG. 10 is a simplified bottom plan view illustrating the arrangement of the lens and masking apparatus of FIG. 9.

FIGS. 8-10 depict another alternate embodiment of the invention, wherein a complex fresnel-type lens 100 similar to the lens 11 of FIG. 1 is provided to include a plurality of discrete focusing segments 102 arranged concentrically with respect to each other. Each one of the focusing segments 102 includes a plurality of concentrically arranged, and relatively small annular refracting surfaces or facets 104 each for focusing radiation on a circular target surface 106. Accordingly, each one of the focusing segments 102 of the lens 100 comprises in essence a separate lens as described above in detail with respect to the embodiments of FIGS. 1-5.

Each focusing segment 102 of the lens 100 has its respective plurality of focusing facets 104 tailored to irradiate the area of the target surface 106 with a prescribed magnitude or concentration of energy distribution. Moreover, in the preferred embodiment of the lens 110, the focusing segments 102 include facets 104 for irradiating the target surface with substantially the same light energy distribution. With this design, the concentration of light energy upon the target surface comprises a summation of the energy concentration distribution for each discrete one of the plurality of focusing segments 102.

An iris diaphragm 108 is illustrated in FIGS. 9 and 10 for masking the light refracted by a predetermined number of the focusing segments 102 of the lens 100. The iris diaphragm 108 comprises a plurality of overlapping plates 110 carried in a suitable housing 112, and appropriately operated in a known manner to provide a circular opening 114 of adjustable size for passage of light refracted by the focusing segments 102 of the lens 100. Adjustment of the size of the iris diaphragm opening 114 serves to mask selectively the light refracted by a predetermined number of the lens focusing segments 102. Adjustment of the opening 114 through a plurality of discrete positions allows the magnitude of light energy irradiating the target surface 106 to be adjusted correspondingly in a number of discrete steps.

The lens 100 of FIGS. 8-10 has particular application in a laboratory environment wherein it is necessary to irradiate light responsive devices such as solar cells with different known magnitudes of prescribed distributions of light energy in order to ascertain correctly the precise response characteristics of the device. For example the plurality of focusing segments 102 can be designed each to include facets 104 for irradiating the device with a substantially uniform energy distribution, or any other special energy distribution. Operation of the iris diaphragm 108 allows the laboratory technician to adjust accurately and repeatedly the magnitude of the light energy incident upon the device through a plurality of discrete and known steps while maintaining the same energy distribution over the surface area of the device.

While a particular form of the invention has been illustrated and described, it will be understood by one of ordinary skill in the art that various mofications can be made without departing from the spirit and scope of the invention. For example, it will be understood that the lens 100 of FIGS. 8-10 can be constructed to include linear focusing segments each with a plurality of linear focusing facets for cooperation with linear making means operable for selectively masking the focusing segments. Accordingly, it is not intended that the invention be limited, other than by the appended claims.

I claim:

1. A focusing device for use in concentrating radiation and producing a prescribed distribution of radiation on a target surface, said device comprising:
a body positioned adjacent the target surface and adapted to receive radiation, said body having a plurality of discrete radiation focusing segments each including a plurality of discrete focusing surfaces formed therein;
wherein each of said focusing surfaces of each one of said focusing segments has a prescribed angle relative to the radiation it receives, causing such radiation to be redirected by the focusing surface to a predetermined portion of the target surface, wherein the paths of redirected radiation, if not interrupted by the target surface, do not all converge at a common point, wherein the radiation redirected onto the target surface by each of said focusing segments has the prescribed radiation distribution, and wherein a superposition of the radiation redirected by all of said focusing segments likewise produces the prescribed distribution of radiation over the target surface.

2. A focusing device as defined in claim 1, wherein said body is formed of a transparent material, and said focusing surfaces of each of said focusing segments operate to refract the radiation onto the target surface with substantially the same energy distribution.

3. A focusing device as defined in claim 2, wherein the energy distribution of radiation refracted onto the target surface by said focusing surfaces of each of said focusing segments is substantially uniform throughout the area of said target surface.

4. A focusing device as defined in claim 1, wherein said focusing segments are substantially annular and arranged in a concentric relationship.

5. A focusing device as defined in claim 1, wherein each of said focusing surfaces of each of said focusing segments operates to redirect radiation it receives to a unique portion of the target surface.

6. A focusing device as defined in claim 5, wherein the angles of the respective focusing surfaces of each of said focusing segments relative to the received radiation are nondecreasing, from a minimum at the centerline of the device to a maximum at the periphery of the device.

7. A focusing device as defined in claim 1, wherein said focusing surfaces are substantially of equal width.

8. A focusing device as defined in claim 1, and further including means for selectively masking radiation redirected by a predetermined number of the plurality of focusing segments for selectively controlling the magnitude of radiation received upon the target surface in a plurality of discrete steps.

9. A focusing device as defined in claim 8, wherein said focusing segments are substantially annular and arranged in a concentric relationship, and wherein said masking means comprises an iris diaphragm.

10. A combination comprising:
a target surface for receiving radiation;
a fresnel-type lens having a plurality of radiation focusing segments each including a plurality of focusing surfaces for concentrating radiation over the area of said target surface with a prescribed radiation distribution, wherein the relative radiation distribution independent of magnitude for each of said focusing segments is substantially identical; and
means for selectively masking radiation redirected by a predetermined number of the plurality of focusing segments for selectively controlling the magnitude of radiation independent of distribution received upon the target surface in a plurality of discrete steps.

11. A combination as defined in claim 10, wherein said focusing segments are substantially annular and arranged in a concentric relationship, and wherein said masking means comprises an iris diaphragm positioned generally between said lens and said target surface.

12. A combination as defined in claim 10, wherein: the prescribed distribution of radiation on the entire target surface for each of said focusing segments is substantially uniform.

13. A focusing device for use in concentrating radiation and producing a prescribed distribution of radiation on a target surface, said device comprising:
- a substantially planar body positioned adjacent the target surface and adapted to receive the radiation, said body having a plurality of discrete focusing segments each having a plurality of substantially equal-width radiation redirecting facets formed therein;
- each of said redirecting facets of each of said focusing segments having a prescribed angle relative to the radiation it receives to redirect the radiation to a unique portion of said target surface, wherein the paths of redirected radiation, if not interrupted by the target surface, do not all converge at a common point, wherein the radiation redirected onto the target surface by the facets of each focusing segment has the prescribed radiation distribution, and wherein a superposition of the radiation redirected by all of said focusing segments likewise produces the prescribed distribution of radiation on the target surface, and
- means for selectively masking radiation redirected by a predetermined number of the plurality of focusing segments for selectively controlling the magnitude of radiation received upon the target surface in a plurality of discrete steps.

14. A focusing device as defined in claim 13, wherein: the target surface is substantially circular;
- said focusing segments comprise a plurality of concentric refracting lens segments; and
- the prescribed distribution of radiation is substantially uniform over the entire target surface for each of said focusing segments.

15. A focusing device as defined in claim 14 wherein said masking means comprises an iris diaphragm disposed generally between said body and said target surface.

* * * * *